United States Patent [19]

Balme et al.

[11] Patent Number: 4,950,700

[45] Date of Patent: Aug. 21, 1990

[54] POLYAMIDE-IMIDE SOLUTIONS AND A PROCESS FOR OBTAINING THEM

[75] Inventors: Maurice Balme, Sainte Foy les Lyon; Pascal Barthelemy, Lyon, both of France

[73] Assignee: Rhone-Poulenc Fibres, Lyon, France

[21] Appl. No.: 308,009

[22] Filed: Feb. 9, 1989

[30] Foreign Application Priority Data

Feb. 22, 1988 [FR] France ................................ 88 02328

[51] Int. Cl.$^5$ ............................. C08J 3/00; C08J 3/02
[52] U.S. Cl. ................................. 524/111; 524/211; 524/233; 528/73; 528/84
[58] Field of Search ........................ 524/111, 211, 233; 528/73, 84

[56] References Cited

U.S. PATENT DOCUMENTS

| | | | |
|---|---|---|---|
| 3,903,036 | 9/1975 | Gruffaz et al. | 524/104 |
| 4,181,641 | 1/1980 | Boldebuck et al. | 524/376 |
| 4,549,006 | 10/1985 | Zecher et al. | 528/73 |

*Primary Examiner*—Veronica P. Hoke
*Assistant Examiner*—Anang U. Sridharan
*Attorney, Agent, or Firm*—Stevens, Davis, Miller & Mosher

[57] ABSTRACT

The present invention relates to solutions of polyamide-imides which can be spun and shaped, and to a process for their preparation.

They contain 5 to 30% of a polyamide-imide in a solvent mixture comprising 40–80% by weight of butyrolactone and 20–60% of an aprotic amide solvent. They are obtained by the reaction, in butyrolactone as polycondensation solvent, of a diisocyanate, an aromatic acid anhydride, optionally an alkali or alkaline-earth metal dicarboxybenzenesulfonate, and optionally another aromatic diacid, the concentration of polyamide-imide being from 15 to 36%, followed by dilution in an amide solvent, at a temperature between 120° and 165° C.

The solutions obtained are clear at room temperature, are storable, and possess improved color.

20 Claims, No Drawings

POLYAMIDE-IMIDE SOLUTIONS AND A PROCESS FOR OBTAINING THEM

The present invention relates to solutions of polyamides-imides which can be directly spun and shaped in a solvent mixture.

It also relates to a process for obtaining solutions which exhibit an improved colour.

It is already known according to FR 2,079,785, to prepare solutions based on polyamides-imides in N-methylpyrrolidone, but these solutions and the polymers thus obtained exhibit an intense brown colour which limits the possibilities of subsequent colouring of the articles shaped by starting with these solutions.

The objective of the present invention is therefore to obtain solutions of polyamides-imides of much weaker colour than that observed with N-methylpyrrolidone as sole solvent.

More particularly, it relates to clear solutions of polyamides-imides (PAI) which can be spun and shaped directly, containing:

(a) 5 to 30% by weight of a PAI comprising amide-imide repeat units (A) of formula:

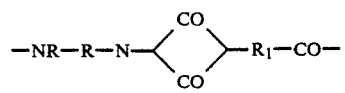

if desired, amide repeat units (B) of formula:

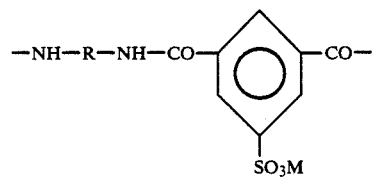

if desired, amide units (C) of formula:

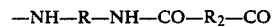

in which:
R=divalent organic group free from any ether group,
$R_1$=trivalent aromatic radical
$R_2$=divalent aromatic radical
M=alkali or alkaline-earth metal, in
(b) a solvent mixture comprising:
40 to 80% by weight of anhydrous γ-butyrolactone (γBL), free from butyl alcohol 20 to 60% by weight of an anhydrous aprotic amide solvent of high boiling point.

They additionally have a colour quantified by measurement of the absorbance at a wavelength γ500 nm, of a 21% strength solution of polymer diluted 10-fold in a Shimadzu spectrophotometer of between 0.05 and 0.20, preferably between 0.08 and 0.17.

The present invention also relates to a process for obtaining clear solutions which can be spun and shaped directly, based on polyamides-imides, comprising the reaction producing the polyamide-imide, carried out in anhydrous γ-butyrolactone, free from butyl alcohol as polycondensation solvent, the polymer concentration before dilution being then between 12 and 39%, and the dilution subsequently performed at a temperature of between 120 and 165° C. in an anhydrous amide aprotic solvent of high boiling point, the final concentration in the solvent mixture being between 5 and 30% by weight.

The solutions according to the present invention are prepared by reaction, in γ-butyrolactone free from butyl alcohol, between:
at least one diisocyanate of formula OCN—R—NCO in which R is a divalent organic group free from any ether group,
an aromatic acid anhydride,
if desired, an alkali or alkaline-earth metal 3,5-dicarboxybenzenesulphonate, in such proportions that the molar ratio diisocyanate/all acidic reactants is substantially equal to 1, and
if desired, an aromatic diacid.

Among the diisocyanates which may be employed there may be mentioned aromatic diisocyanates, tolylene diisocyanates, preferably symmetrical such as 4,4'-diphenylmethane diisocyanate or other diisocyanates such as biscyclohexyl diisocyanate.

It is also possible to employ a number of the diisocyanates referred to above. However, 4,4'-diphenylmethane diisocyanate is preferably employed.

On the other hand, the use of 4,4'-diphenyl ether diisocyanate is excluded from the invention because the corresponding polyamide-imide precipitates without any previous increase in viscosity, so that the solutions obtained can neither be stored nor used.

Trimellitic anhydride is preferably employed as an aromatic acid anhydride.

Sodium or potassium sulphonate is preferably employed as an alkali or alkaline-earth metal 3,5-dicarboxybenzenesulphonate.

Terephthalic and isophthalic acids are generally employed among the aromatic diacids, although terephthalic acid is preferred.

The various acidic or acid anhydride compounds are present in the following molar proportions:
aromatic acid anhydride from 80 to 100% relative to all the acidic reactants, preferably
85 to 95%,
aromatic diacid from 0 to 20%, preferably from 5 to 15%,
dicarboxybenzenesulphonate in a proportion of 0 to 5%, preferably 1 to 3% relative to all the acidic reactants.

The reaction takes place at elevated temperature, generally between 170 and 200° C. in pure and anhydrous γ-butyrolactone (from which butyl alcohol has been removed by distillation).

At the end of the polycondensation reaction, the polymer concentration is between 12 and 39%, preferably between 15 and 36%, and a dilution is carried out with an anhydrous aprotic amide solvent of high boiling point so as to make the final polyamide-imide concentration between =and 30 %, preferably and 27 %. The term "aprotic amide solvent of high boiling point" as used herein means an amide not containing active hydrogen, having a boiling point of at least 50 ° C.

The dilution is performed at a temperature between 120° and 165° C., preferably between 140° and 160° C.

Below 125° C. the solution reprecipitates before dilution with the amide solvent.

Among the dilution solvents there may be mentioned N-methyl-2-pyrrolidone, dimethylacetamide, dimethylformamide and tetramethylurea.

γ-Butyrolactone is present in the final solution at between 40 and 80% by weight, preferably 50 to 80%, and the dilution solvent in a proportion of 20 to 60%, preferably 20 to 50%. If these proportions are not observed, precipitations of polyamide-imide take place. γ-Butyrolactone is used solely as a polycondensation solvent, whereas the amide solvents are used solely for dilution and hence for obtaining the solutions in order that the latter may have an improved colour.

If the order of addition of the solvents is reversed, then either polycondensation does not take place or precipitation is produced, or, furthermore, the viscosity is insufficient.

The solutions thus obtained are clear and exhibit a colour which is quantified by the measurement of the absorbance at a wavelength $\lambda$ of 500 nm of a 21% strength solution of polymer diluted 10-fold in a Shimadzu spectrophotometer, of between 0.05 and 0.2, preferably between 0.08 and 0.17.

The viscosity of the solutions obtained according to the invention can vary widely. It is measured on a 21% strength solution of polymer in an apparatus of the Epprecht Rheomat 15 type - vessel D+E.

With certain cosolvents, such as dimethylformamide or dimethylacetamide at a constant solids content and with identical polycondensation solvent/dilution solvent ratios, the viscosity of the solutions can be adjusted over a wide range. A decrease in the viscosity of the spinning solutions is observed at an identical molecular mass, and this will make it possible to work with higher solids contents, thus promoting the structuring of the filaments obtained by spinning.

Furthermore, as a reaction solvent, γ-butyrolactone has a high boiling point, and this makes it possible to perform the polycondensation at elevated temperatures for a short time and to obtain solutions which are stable and homogeneous at ambient temperature and with time, that is to say that they exhibit neither any precipitation nor any appreciable change in viscosity.

The solutions according to the invention may be obtained continuously or noncontinuously by means of any suitable apparatus.

The solutions according to the invention can be shaped, and in particular can be spun using wet or dry spinning processes.

In the tests which follow the values of $\overline{Mn}$ and $\overline{Mw}$ are determined by gel exclusion chromatography (GPC) in N-methylpyrrolidone at 80°C. and 0.1 mole/liter of lithium bromide, the masses being expressed relative to a polystyrene calibration.

The polydispersity index I corresponds to the ratio $\overline{Mw}/\overline{Mn}$ The examples below illustrate the present invention without limiting it.

EXAMPLE 1

| Reactants: | |
|---|---|
| reaction solvent: | |
| distilled γ-butyrolactone (γBL) | 490 g (d = 1.13) 434 ml |
| trimellitic anhydride (TMAN) | 76.8 g (0.4 mole) |
| terephthalic acid (TA) | 13.28 g (0.08 mole) |
| sodium 3,5-dicarboxybenzenesulphonate (NaAIS) | 5.36 g (0.02 mole) |
| 4,4'-diphenylmethane diisocyanate (MDI) | 125 g (0.5 mole) |
| dimethylacetamide (DMAC) | 192 g (d = 0.94) 204 ml |

-continued

| Reactants: | |
|---|---|
| dilution solvent | |

The abovementioned monomers and the reaction solvent are introduced in the proportions shown into a stirred reactor fitted with a reflux condenser, a nitrogen inlet, a thermostated oil bath and a dropping funnel for adding the dilution solvents. The temperature is raised gradually from ambient temperature to 198° C. over approximately 2 hours and the reaction mixture is allowed to return to 170° C. The concentration is then 27%.

The dilution solvent is run into the reactor over 8 minutes and the reaction mixture is cooled progressively to be stored. The concentration is then 21%.

The polymer is soluble in the solvent mixture at ambient temperature. Molecular masses of the polymer $\overline{Mn}=38,700 - \overline{Mw}$ 112,000 − I=2.9.

EXAMPLE 2

| Reactants: | |
|---|---|
| reaction solvent: | |
| distilled γ-butyrolactone | 294 g (d = 1.13) — 260 ml |
| TMAN | 46.08 g (0.24 mole) |
| TA | 7.97 g (0.048 mole) |
| NaAIS | 3.22 g (0.012 mole) |
| MDI | 75 g (0.3 mole) |
| dimethylformamide dilution solvent | 115.2 g (d = 0.94) — 123 ml |

The procedure is the same as in Example 1, but using dimethylformamide as dilution solvent, run in over 6 min. The polymer is soluble in the solvent mixture at ambient temperature. Molecular masses of polymer $\overline{Mn}=22,440 - \overline{Mw}=53,450 - I=2.38$. The solution characteristics are shown in Table 1 below.

EXAMPLE 3

| Reactants: | |
|---|---|
| reaction solvent | |
| distilled γ-butyrolactone | 294 g (d = 1.13) — 260 ml |
| TMAN | 46.08 g (0.24 mole) |
| TA | 7.97 g (0.048 mole) |
| NaAIS | 3.22 g (0.012 mole) |
| MDI | 75 g (0.3 mole) |
| distilled tetramethylurea (TMU) dilution solvent | 115.2 g (d = 0.97) — 119 ml |

The procedure solvent 115.2 g (d=0.97)—119 ml using distilled tetramethylurea as dilution solvent, which is introduced over 10 min. The solution obtained is clear at ambient temperature. The solution characteristics are shown in Table 1 below. Molecular masses of the polymer $\overline{Mn}=23,160 - \overline{Mw}=52,820 - I=2.28$.

EXAMPLE 4

| Reactants: | |
|---|---|
| reaction solvent | |
| distilled γ-butyrolactone | 588 g (d = 1.13) — 520 ml |
| TMAN | 92.16 g (0.48 mole) |
| TA | 15.94 g (0.096 mole) |
| NaAIS | 6.43 g (0.024 mole) |
| MDI | 150 g (0.6 mole) |
| N-methylpyrrolidone (NMP) | 230.4 g (d = 1.03) — 224 ml |

-continued

| Reactants: |
|---|
| dilution solvent |

The procedure is as indicated in Example 1, but using N-methylpyrrolidone as dilution solvent, which is run in over 10 min. Molecular masses of the polymer $\overline{Mn}=25,260-\overline{Mw}=62,200-I=2.46$.

The solution characteristics are shown in Table 1 below.

EXAMPLE 5 - (control)

A polyamide-imide solution is prepared from the same monomers, in quantities which are identical with those described in Example 1, but using N-methylpyrrolidone as the sole solvent, according to the process described in FR 2,079,785. Molecular masses of the polymer: $\overline{Mn}=28,700-\overline{Mw}=81,700-I=2.8$.

EXAMPLE 6

| Reactants: | |
|---|---|
| reaction solvent distilled γ-butyrolactone (γBL) | 490 g (d = 1.13) — 434 ml |
| TMAN | 76.8 g (0.4 mole) |
| TA | 13.28 g (0.08 mole) |
| NaAIS | 5.36 g (0.02 mole) |
| 4,4'-diphenyl ether diisocyanate (DEDI) | 126 g (0.5 mole) |
| dimethylacetamide (DMAC) dilution solvent | 192 g (d = 0.94) — 204 ml |

A reactor identical with that employed in Example 1 is employed.

The temperature is raised from ambient temperature to 198° C. over approximately 2 hours and is maintained, with stirring, for over one hour.

Precipitation is seen to begin after 135 min of reaction without any preliminary viscosity rise.

After 155 min of reaction the reaction mixture is very thick. Addition of N-methylpyrrolidone diluent does not redissolve the precipitate, so that no solution which can be spun or shaped can be obtained, even after heating has been continued for 30 min at 198° C.

The use of 4,4'-diphenyl ether diisocyanate does not lead to solutions which can be used and is excluded from the invention.

TABLE 1

| Ex. | reaction/dilution solvent | weight ratio - % | colour (λ) | viscosity $\eta(25° - 21\%)$ |
|---|---|---|---|---|
| 1 | γBL/DMAC | 72/28 | 0.170 | 620 |
| 2 | γBL/DMF | 72/28 | 0.095 | 560 |
| 3 | γBL/TMU | 72/28 | 0.086 | 850 |
| 4 | γBL/NMP | 72/28 | 0.143 | 764 |
| 5 | NMP/NMP | 72/28 | 0.505 | 800 |
| 6 | γBL/NMP | 72/28 | — | — |

EXAMPLE 7

| Reactants: | |
|---|---|
| reaction solvent γ-butyrolactone | 11.435 g |
| trimellitic anhydride (TMAN) | 2.58 g (0.01344 mole) |
| terephthalic acid (TA) | 0.445 g (0.00268 mole) |
| sodium 3,5-dicarboxybenzene sulphonate (NaAIS) | 0.1795 g (0.00067 mole) |
| 4,4'-diphenylmethane diisocyanate (MDI) | 4.2 g (0.0168 mole) |
| N-methylpyrrolidone dilution solvent | 11.435 g |

The monomeric reactants and the reaction solvent are charged under nitrogen into a round-bottomed flask fitted with a condenser and a stirrer. The reaction mixture is stirred and immersed in an oil bath thermostated at 198° C. It takes 10 min to reach 198° C. The reaction mixture is kept stirred for 2 h 15 min. The reaction mixture is allowed to cool to 140° C. and the dilution solvent is then added. The solution is clear at ambient temperature. Molecular masses of the polymer $\overline{Mn}=34,210-\overline{Mw}=100,260-I=2,93$. The solution characteristics are given in Table 2 below.

EXAMPLE 8

The procedure followed is as in Example 7, with the same reactants, but with a ratio of 60/40 between the reaction solvent and the dilution solvent, that is to say with 13.72 g of γBL and 9.15 g of NMP.

The solution obtained is clear and stable at ambient temperature; the characteristics are given in Table 2. Molecular masses of the polymer $\overline{Mn}=32,130-\overline{Mw}=90,290-I=2.81$.

EXAMPLE 9

The procedure is as indicated in Example 7, with the same reactants but with a reaction solvent/dilution solvent ratio of 72/28, that is to say using 16.46 g of γBL and 6.45 g of NMP.

The solution is clear and stable at ambient temperature; its characteristics are given in Table 2. Molecular masses of the polymer $\overline{Mn}=25,300-\overline{Mw}=73,370-I=2.90$.

EXAMPLE 10

The procedure is as indicated in Example 7, but with a reaction solvent/dilution solvent ratio of 80/20, namely 18.296 g of γBL and 4.574 g of NMP.

A solution which is clear and stable at ambient temperature is obtained, and its characteristics are given in Table 2. Molecular masses of the polymer $\overline{Mn}=41,000-\overline{Mw}=148,860-I=3.63$.

EXAMPLE 11 - (comparative)

The procedure is as indicated in Example 7, but with a reaction solvent/dilution solvent ratio of 90/10, namely 20.583 g of distilled γBL and 2.287 g of NMP.

The solution obtained reprecipitates at ambient temperature, so that a solution of this kind cannot be employed for spinning, and it is therefore excluded from the invention.

EXAMPLE 12

The procedure is as indicated in Example 7, but with dimethylacetamide (DMAC) as dilution solvent and a reaction solvent/dilution solvent ratio of 50/50, in a proportion of 11.435 g of γBL and 11.435 g of DMAC. DMAC is added when the temperature of the reaction mixture is at 160° C.

The solution obtained is stable at ambient temperature; its characteristics are given in Table 2. Molecular masses of the polymer $\overline{Mn}=33{,}360-\overline{Mw}=97{,}750-I=2.93$.

EXAMPLE 13

The procedure is as indicated in Example 12, but with a γBL/DMAC ratio of 60/40, in a proportion of 13.72 g of γBL and 9.15 g of DMAC.

The solution obtained is stable at ambient temperature; its characteristics are given in Table 2. Molecular masses of the polymer $\overline{Mn}=37{,}500-\overline{Mw}=107{,}230=I=2.86$.

EXAMPLE 14

The procedure is as indicated in Example 12, but with a γBL/DMAC ratio of 80/20, namely 18.296 g of γBL and 4.574 g of DMAC.

The solution obtained is stable at ambient temperature; its characteristics are given in Table 2. Molecular masses of the polymer $\overline{Mn}=43{,}030-\overline{Mw}=161{,}050-I=3.74$.

EXAMPLE 15 - (comparative)

Example 12 is repeated but with a γBL/DMAC ratio of 90/10, namely 20.583 g of γBL and 2.287 g of DMAC.

With such a ratio, precipitation at ambient temperature is obtained.

EXAMPLE 16

Example 7 is repeated with tetramethylurea (TMU) as dilution solvent, with a γBL/TMU ratio of 72/28, namely 16.46 g of γBL and 6.45 g of TMU.

The solution obtained is clear and stable at ambient temperature; its characteristics are given in Table 2. Molecular masses of the polymer $\overline{Mn}=23{,}160-\overline{Mw}=61{,}200-I=2.64$.

EXAMPLE 17

The procedure is as indicated in Example 7, with dimethylformamide (DMF) as dilution solvent and a γBL/DMF ratio of 72/28, namely 16.46 g of γBL and 6.45 g of DMF.

The solution obtained is clear and stable at ambient temperature; its characteristics are given in Table 2.

EXAMPLE 18 - (comparative)

The procedure is as indicated in Example 7, but with γ-butyrolactone as dilution solvent, with a reaction solvent/dilution solvent ratio of 72/28.

The solution obtained is unusable; it reprecipitates at ambient temperature.

TABLE 2

| Examples | polycondensation solvent (S1) | dilution solvent (S2) | weight ratio S1/S2 |
|---|---|---|---|
| 7 | γBL | NMP | 50/50 |
| 8 | γBL | NMP | 60/40 |
| 9 | γBL | NMP | 72/28 |
| 10 | γBL | NMP | 80/20 |
| 11 | γBL | NMP | 90/10 |
| 12 | γBL | DMAC | 50/50 |
| 13 | γBL | DMAC | 60/40 |
| 14 | γBL | DMAC | 80/20 |
| 15 | γBL | DMAC | 90/10 |
| 16 | γBL | TMU | 72/28 |
| 17 | γBL | DMF | 72/28 |
| 18 | γBL | γBL | 72/28 |

TABLE 2-continued

| Examples | colour | viscosity η 25° (poises) at (c) = 21% w/w | comments |
|---|---|---|---|
| 7 | 0.130 | 340 | clear at 20° C. |
| 8 | 0.137 | 315 | clear at 20° C. |
| 9 | 0.143 | 636 | clear at 20 ° C. |
| 10 | 0.140 | 2,834 | clear at 20° C. |
| 11 | — | — | comparative example - reprecipitation at 20° C. |
| 12 | 0.153 | 74 | clear at 20° C. |
| 13 | 0.162 | 346 | clear at 20° C. |
| 14 | 0.165 | 2,141 | clear at 20° C. |
| 15 | — | — | comparative example - reprecipitation at 20° C. |
| 16 | 0.086 | 853 | clear at 20° C. |
| 17 | 0.095 | 507 | clear at 20° C. |
| 18 | — | — | comparative example - reprecipitation at 20° C. |

We claim:

1. Clear solutions which can be spun and shaped directly, characterized in that they contain:
   (a) 5 to 30% by weight of a polyamide-imide comprising amide-imide repeat units (A) of formula:

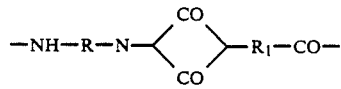

amide repeat units (B) of formula:

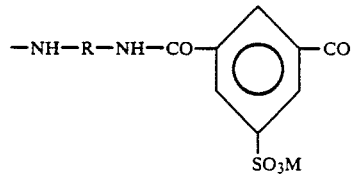

amide repeat units (C) of formula:

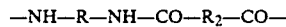

in which:
   R = divalent organic radical free from any ether group
   $R_1$ = trivalent aromatic radical
   $R_2$ = divalent aromatic radical
   M = alkali or alkaline-earth metal, the units A representing 80 to 100% of all the units
   the units B representing 0 to 5% of all the units
   the units C representing 0 to 20% of all the units (b) in a solvent mixture comprising:
   40–80% by weight of anhydrous γbutyrolactone free from butyl alcohol
   20–60% of an anhydrous aprotic amide solvent of high boiling point.

2. Solutions according to claim 1, characterized in that they have a colour quantities by the measurement of the absorbance at the same wavelength of 500 nm of a 21% strength solution of polymer diluted 10-fold by means of a Shimadzu spectrophotometer, of between 0.05 and 0.2.

3. Solutions according to claim 1, characterized in that the solvent mixture comprises 50 to 80% of γbutyrolactone and 20 to 50% of an aprotic amide solvent of high boiling point.

4. Spinnable solutions according to claim 1, characterized in that the concentration of polyamide-imide in the mixture is between 6 and 27%.

5. Spinnable solutions according to claim 1, characterized in that the amide solvent is N-methylpyrrolidone, dimethylacetamide, dimethylformamide or tetramethylurea.

6. Spinnable solutions according to claim 1, characterized in that in the units A, B, C and R are aromatic or aliphatic radicals.

7. Spinnable solutions according to claims 1 or 6, characterized in that R is a radical of formula

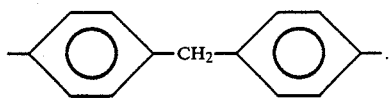

8. Spinnable solutions according to claim 1, characterized in that the amide-imide units A contain a radical $R_1$ of formula

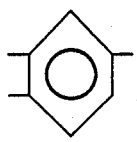

9. Spinnable solutions according to claim 1, characterized in that the amide units B contain a radical $R_2$ of formula

10. Spinnable solutions according to claim 1, characterized in that the amide units B contain a group $SO_3M$ in which M is an alkali metal.

11. Process for obtaining solutions which can be spun and shaped directly, based on polyamides-imides, characterized in that:

the polycondensation is carried out between at least
a. a diisocyanate of formula —OCN—R—N-CO—in which R is a divalent organic group free from any ether group,
b. an aromatic acid anhydride,
c. an alkali or alkaline-earth metal 3,5-dicarboxybenzenesulphonate,
d. an aromatic diacid
in such proportions that the molar ratio a/(b+c+d) is substantially equal to 1 and that the acid anhydride is present in a proportion of 80 to 100 mol%, the benzenesulphonate in a proportion of 0 to 5%, the aromatic acid in a proportion of 0 to 20 mol% relative to all the acidic reactants, in anhydrous γbutyrolactone free from butyl alcohol as polycondensation solvent, the polymer concentration before dilution being between 12 and 39%, and then the dilution is subsequently carried out at a temperature of between 120° and 165° C. in an aprotic amide solvent of high boiling point so as to give a final concentration of polyamide-imide in the solvent mixture of between 5 and 30% and so as to give a weight ratio reaction solvent/dilution solvent of between 40/60 and 80/20.

12. Process according to claim 11, characterized in that the weight ratio reaction solvent/dilution solvent is between 50/50 and 80/20.

13. Process according to claim 11, characterized in that the polymer concentration before dilution is between 15 and 36%.

14. Process according to claim 11, characterized in that the polymer concentration after dilution is between 6 and 27%.

15. Process according to claim 11, characterized in that the dilution is performed at a temperature of between 140 and 160° C.

16. Process according to claim 11, characterized in that the diisocyanate employed is an aromatic or aliphatic diisocyanate.

17. Process according to claim 11 or 16, characterized in that the diisocyanate employed is 4,4'-diphenylmethane diisocyanate.

18. Process according to claim 11, characterized in that the aromatic acid anhydride is trimellitic anhydride.

19. Process according to claim 11, characterized in that the aromatic acid is terephthalic acid.

20. Process according to claim 11, characterized in that the benzenesulphonate is the sodium or potassium salt.

* * * * *